United States Patent
Rohan et al.

(10) Patent No.: US 8,572,753 B2
(45) Date of Patent: Oct. 29, 2013

(54) METHODS AND APPARATUS FOR SELECTING AND DELIVERING CONTENT

(75) Inventors: Charles G. V. Rohan, Edinburgh (GB); Andrew Colley, Dundee (GB)

(73) Assignee: NCR Corporation, Duluth, GA (US)

(*) Notice: Subject to any disclaimer, the term of this patent is extended or adjusted under 35 U.S.C. 154(b) by 557 days.

(21) Appl. No.: 12/644,104

(22) Filed: Dec. 22, 2009

(65) Prior Publication Data

US 2011/0154499 A1 Jun. 23, 2011

(51) Int. Cl.
*H04L 29/06* (2006.01)

(52) U.S. Cl.
USPC ............. 726/26; 709/223; 715/706; 715/733; 84/609; 84/612

(58) Field of Classification Search
USPC ....... 726/26; 709/224; 715/706, 733; 84/609, 84/612; 707/36, 741
See application file for complete search history.

(56) References Cited

U.S. PATENT DOCUMENTS

| | | | |
|---|---|---|---|
| 2007/0074619 A1* | 4/2007 | Vergo | 84/612 |
| 2008/0134043 A1* | 6/2008 | Georgis et al. | 715/733 |
| 2009/0044687 A1* | 2/2009 | Sorber | 84/609 |
| 2009/0172538 A1* | 7/2009 | Bates et al. | 715/706 |
| 2009/0291805 A1* | 11/2009 | Blum et al. | 482/9 |
| 2010/0017819 A1* | 1/2010 | Gerbrandt et al. | 725/34 |
| 2010/0138416 A1* | 6/2010 | Bellotti | 707/736 |

* cited by examiner

*Primary Examiner* — Brandon Hoffman
*Assistant Examiner* — Hee Song
(74) *Attorney, Agent, or Firm* — Peter H. Priest

(57) ABSTRACT

Systems and techniques for selecting and delivering entertainment content. User preference information for entertainment content to accompany user activities is collected and associated with a user. Upon indication by a user of a desire to receive content and designation of an activity to be accompanied by the content, content items are selected and assembled into a package so that the content items may be played in sequence using a user device. The content items comprising the package are delivered to the user device.

20 Claims, 2 Drawing Sheets

METHODS AND APPARATUS FOR SELECTING AND DELIVERING CONTENT

FIELD OF THE INVENTION

The present invention relates generally to improved systems and techniques for delivery of entertainment content, such as video and music content. More particularly, the invention relates to improved systems and techniques for selecting entertainment content appropriate to a user activity and delivering the entertainment content to the user.

BACKGROUND OF THE INVENTION

The increased use of digital devices for the playing of entertainment content has vastly increased the selection of content available to users. Users are able to download or stream content to play through their home computers or through dedicated media devices with many of the capabilities of computers, and are able to store numerous titles, such as songs, movies, television shows, and video clips, on personal devices. The delivery and storage of content has become easier and easier as the capacity and connectivity of devices has increased. The costs of delivery of content have greatly decreased because the need to deliver content on media has become less and less important. Rather than delivering content on a recorded medium such as a compact disc (CD) or digital versatile disc (DVD), a provider can allow a user to receive content directly to the user's device through the download or streaming of data, so that the cost of the media is essentially free or negligible. Thus, the cost of the content can be related directly to the value of the content, free of any cost of recording media, packaging, storage, physical shipment, or the like.

With the increasing availability and lower cost of delivery of content, users are able to consume more content, choosing content to accompany many of their personal activities, and having access to a wide variety of content for each activity in which a user may engage. For example, a user may select music for a party, including a particular occasion or event, may select music, audiobook, or video for exercise, or may select music, audiobook, or video for traveling, such as a flight or a bus or train commute.

SUMMARY OF THE INVENTION

Among its several aspects, the present invention recognizes that the increase in the availability of content and the increasing ease of delivery has carried its own problems. More and more one, of the primary difficulties a user encounters is not the receiving of content or the affordability of content, but the time required to select content for a particular occasion or mood. Users increasingly select content for essentially background use so that the specific selection of particular titles can present an excessive burden with respect to the relatively low importance of the particular details of the selection and the frequency with which selections may be made.

In its several aspects, the present invention provides improved systems and techniques for automated selection and delivery of content tailored to meet the needs of a particular user at a particular time. A terminal presents an interface to a user and provides direct or wireless connections allowing communication and delivery of content to a user device. The terminal may be one of a network of terminals communicating with a server storing content available for selection, with the terminals taking numerous different forms, such as a self service point of sale kiosk, the user's own home computer communicating with the server over the public Internet, a publicly available computer, a user's media center device, a user's mobile wireless device, or any number of other terminals possessing varying capabilities. A user may initiate an account and make selections relating to user preferences and activities. When a user wishes to receive content, the user indicates his or her identity and may also indicate the activity for which content is to be received. An appropriate package of content is compiled based on the user's preferences and the activity with which the content is to be used. The activity may be specified at the time the package is assembled, or the package may be assembled according to one of a variety of default options. The content package is then delivered to the user's device.

A more complete understanding of the present invention, as well as further features and advantages of the invention, will be apparent from the following Detailed Description and the accompanying drawings.

DETAILED DESCRIPTION

Figure 1:
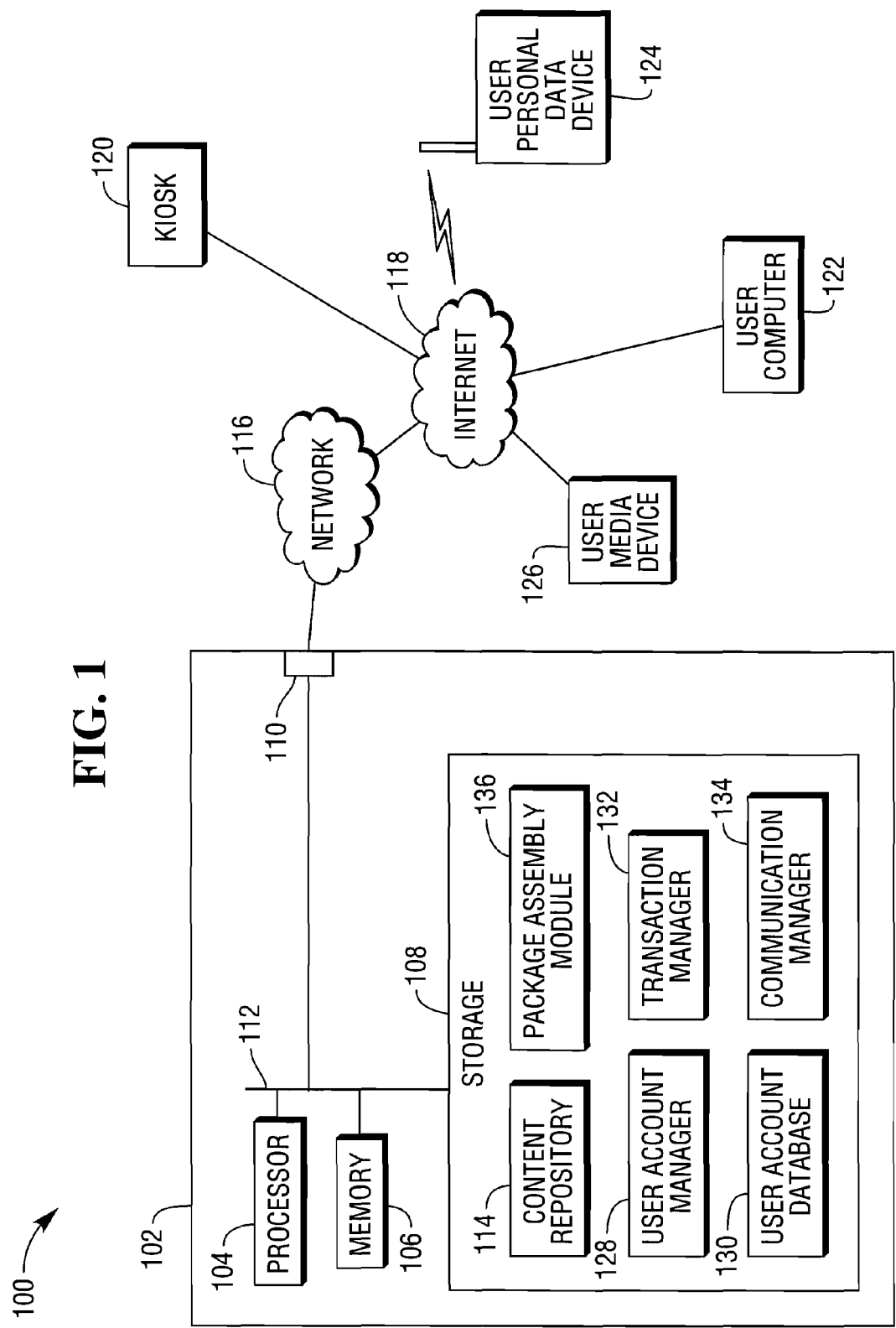
FIG. 1 illustrates a content selection and delivery system according to an aspect of the present invention.

FIG. 1 illustrates a content selection and delivery system 100 according to an aspect of the present invention. The system 100 comprises a central server 102, including a processor 104, memory 106, storage 108, and network interface 110, communicating over a bus 112. The server 102 stores a content repository 114, including a library of audio and video titles, for example. For simplicity a single server 102 is illustrated here, with the content repository 114 residing on the server 102, but it will be recognized that the functions described here may be distributed across data processing equipment as desired. For example, if the system 100 is large, multiple servers may be employed, and if the data repository 114 stores a large number of titles, the repository 114 may be distributed across numerous data storage devices.

Further, while audio and video content are described as examples, it will be recognized that other content may be stored in addition or as an alternative thereto, such as digital books, games, or other software.

The server 102 communicates with one or more user terminals through a network 116, which may suitably provide access to the public Internet 118. The system 100 supports a number of terminals, of which examples presented here include a point of sale kiosk 120, a user's personal computer 122, a user's personal device 124, and a user's media center device 126. The various terminals may suitably communicate with the server 102 through the Internet 118.

The server 102 maintains a user account manager 128, suitably implemented as software residing in storage 108 and transferred to memory 106 as needed for execution by the processor 108. The user account manager 128 creates and maintains a plurality of user accounts stored as user records in a user account database 130. Each user account record includes identification information for the user, as well as a set of user preferences for the types of content preferred both overall and for particular purposes, as well as a history of each content item received and a user rating for each content item, if the user has provided a rating. The user account record for a user also includes identification information for the devices used to communicate with the server 102, allowing convenient identification of a user through the association between a user and an identified device, and also allowing for the evaluation of trends or preferences on a device by device basis if desired.

The server 102 further maintains a transaction manager 132 for managing user transactions for receiving content, and a communication manager 134 for receiving communications from a terminal and responding to the communications as appropriate. When a user initiates contact through a terminal, the communication manager 134 attempts to identify the device and the user associated with the device. If the communication manager 134 cannot identify the device, it presents an interface inviting the user to enter account information or to choose to open an account. If the communication manager 134 identifies the device, or if the user enters account information, the communication manager 134 invokes the transaction manager 132, supplying the transaction manager 132 with the user account information associated with the user record for the user. If the user chooses to open an account, the communication manager 134 invokes the account manager 128, which presents an interface allowing the user to enter personal information, to enter information identifying the various user devices that may be used to play content and to present such devices as the user may have readily available in order to allow the account manager 128 to read identifying information from the devices, such as electronic serial numbers, internet protocol (IP) addresses, stored computer identification indicia, and the like. Once the user has submitted the desired identification information, the account manager 128 presents one or more interfaces allowing the user to submit preferences, including types of video and music preferred by the user, the types of activities or events for which the user may wish accompaniment, the durations of the activities or events, and the preferences of the user with respect to such activities or events. For example, a user may specify different types of exercise activities, such as yoga or aerobics, and may specify a preference for melodious, soothing music for yoga and music with a rapid, distinct beat for aerobics.

The account manger 128 may be invoked not only at the initiation of a user account, but at any time desired by the user or, as appropriate, by the transaction manager 132. The transaction manager 132 provides the account manager 128 with information identifying each content item delivered to the user, and the packaging of the content item. Content items will frequently be delivered as packages appropriate to a user's activities, such as collections of video, collections of songs, playlists of songs already on the user's device, or collections of songs and video, and the transaction manger 132 provides the account manager 128 with information identifying the contents of each such package delivered to a user. The account manager 128 updates the user's account record in order to improve the ability to make selections for the user. In addition, the account manager 128 may also receive rating information provided by the user. When a user opens a new transaction, updates account information, or responds positively to a request to provide information about the user's experience, the user may supply user ratings of content items and packages, including both the overall user evaluation of the item or package and its suitability to the activity with which it was used. The account manager 128 updates the user's account record with rating information provided by the user, and this rating information may be used to enhance selections.

The account manager 128 further presents selections allowing the user to enter payment preferences. For example, a user may enter financial information, such as a credit or debit card number to avoid the need to enter the information during transactions, and may enter preferences relating to the acceptance of advertising with the content. One mechanism for distributing content to users is to include advertising with the content and collect payment from advertisers, thereby reducing or eliminating the financial cost to the user, and a user may choose to receive advertising for some or all content with which advertising is offered, or may choose to receive advertising for content delivered in association with particular activities. Such choices and preferences are stored in the user account record, but these choices and preferences may be changed by the user at any time. In addition, the user may use any desired payment mechanism, or accept or reject advertising, at the time of a transaction, with any previously stored preferences being used as defaults that may be changed as desired in a particular transaction. The transaction manager 132 provides the account manager 128 with information relating to changes from previously stored preferences, or entry of selections with respect to payment and advertising when no previous preferences exist, and the account manager 128 which may use information relating to such changes and entries of selections to modify or create stored preferences for the user.

Once a user has established an account, the user may invoke the transaction manager 132 if desired, or may simply close the session.

When invoked, the transaction manager 132 presents an interface to the user allowing the user to make entries indicating the type and duration of activities or events for which content is needed, and to provide any other information needed to assemble an appropriate package of content. In order to simplify the selection process for the user as much as possible, selections are made based on the activity and the duration and on the user preferences with respect thereto, rather than requiring a user to select specific items and build them into a package. Therefore, the initial interface is relatively simple and need not present the names of specific items for selection. However, options may be made available that will invoke further interfaces allowing a user to select specific titles in order to build his or her own package. If a user does build his or her own package, details of the package are provided to the account manager 128, and the package may be used as a model for subsequent packages assembled for the same or a similar purpose.

If desired, the user may enter additional details of the activity. For example, if the activity is an airplane flight, the user may indicate whether electric power will be available during the flight. Playing of video during a long flight may exceed the battery capacity of most personal video players, so that a package for such a flight would typically consist primarily of audio. However, if electric power is available to the user during the flight, battery capacity is less of an issue and more video can be included in the package if the normal user preferences so indicate.

Once the user has finished making entries, the transaction manager 132 invokes a package assembly module 136, delivering the user preferences and selections to the package assembly module 136. The package assembly module 136 examines the user preferences and selections and assembles an appropriate package based on the user preferences and selections. The package assembly module defines the duration of the package based on factors such as the nature and expected duration of the activity as well as explicit user specification, if any, and balances audio and video based on the nature of the activity and user preferences related to various activities and overall user preferences. For example, a user may specify an overall preference for video over audio, but the package assembly module 136 will nevertheless select audio in cases in which video would be inappropriate, such as walking or running outdoors or for exercise such as weightlifting, which requires relatively short periods of activity and frequent changes of activity.

On the other hand, a user who expresses an overall preference for audio may receive an all audio package for relatively short rides on public transportation, but may receive a package in which the audio is mixed in with video on longer rides, such as intercontinental airplane flights in which the availability of only one type of content may lead to boredom with that type of content.

Once the duration of the package and the balance of the content has been determined, the package assembly module 136 examines the data repository 114 to select content items for the package. Content items are based on such user preferences as are available, such as type of music, audiobook or other spoken word such as poetry or comedy, video genre such as comedy, drama, classic movies, television, and the like. Content, especially video content, may also be chosen in part by duration to fill expected periods of an activity. For example, on a late night transcontinental flight, a 30 minute comedy may fill the period between the time when passengers are allowed to use their portable devices and the beginning of dinner, and a 90 minute movie may fill the period between the conclusion of breakfast and landing at the destination.

Once the content comprising the package has been identified, the package assembly module 136 invokes the transaction manager 132, which presents a list of the content items and their types and genres for approval, together with a price of each item, an overall price, and the choice, if available, to receive advertising in full or partial payment. Once the user has provided approval and the transaction is concluded, the content items comprising the package are retrieved from the repository 114 and made available for delivery to a user device. In one exemplary implementation, each content item is delivered individually, along with a playlist that can be selected by the user in order to play the items in sequence.

If desired, in accordance with user preferences and to simplify the experience for the user, explicit approval and payment need not be performed. Instead, the package may simply be compiled and delivered with payment being conducted on terms previously chosen by the user. In addition, rather than selecting and delivering content, the package assembly module 136 may simply compile a playlist that may be used to select a playback sequence for content already stored on a user's device, such as content previously received from the system 100 or content received from other sources, with a listing of contents of the user's device having been previously stored in the user's account record. If desired, for user devices that support digital rights management (DRM) to allow playback of content only under specified circumstances, the user may choose to download content without being required to pay for it immediately. When playback is desired, the user may submit or authorize payment and receive digital rights management information needed to allow playback. Such a procedure allows a user to download or transfer content, which typically requires longer download or transfer times, at a convenient time. When the user decides to pay for the content and wishes to receive digital rights management information, the digital rights management information can typically be downloaded or transferred much more quickly than can the actual content.

Alternatively or in addition, the use of DRM information may be used to deliver content subject to restricted conditions so that the content may be made available at a lower cost. For example, content may be subject to DRM restrictions allowing for a playback only during a limited time, such as two weeks from delivery.

Figure 2:
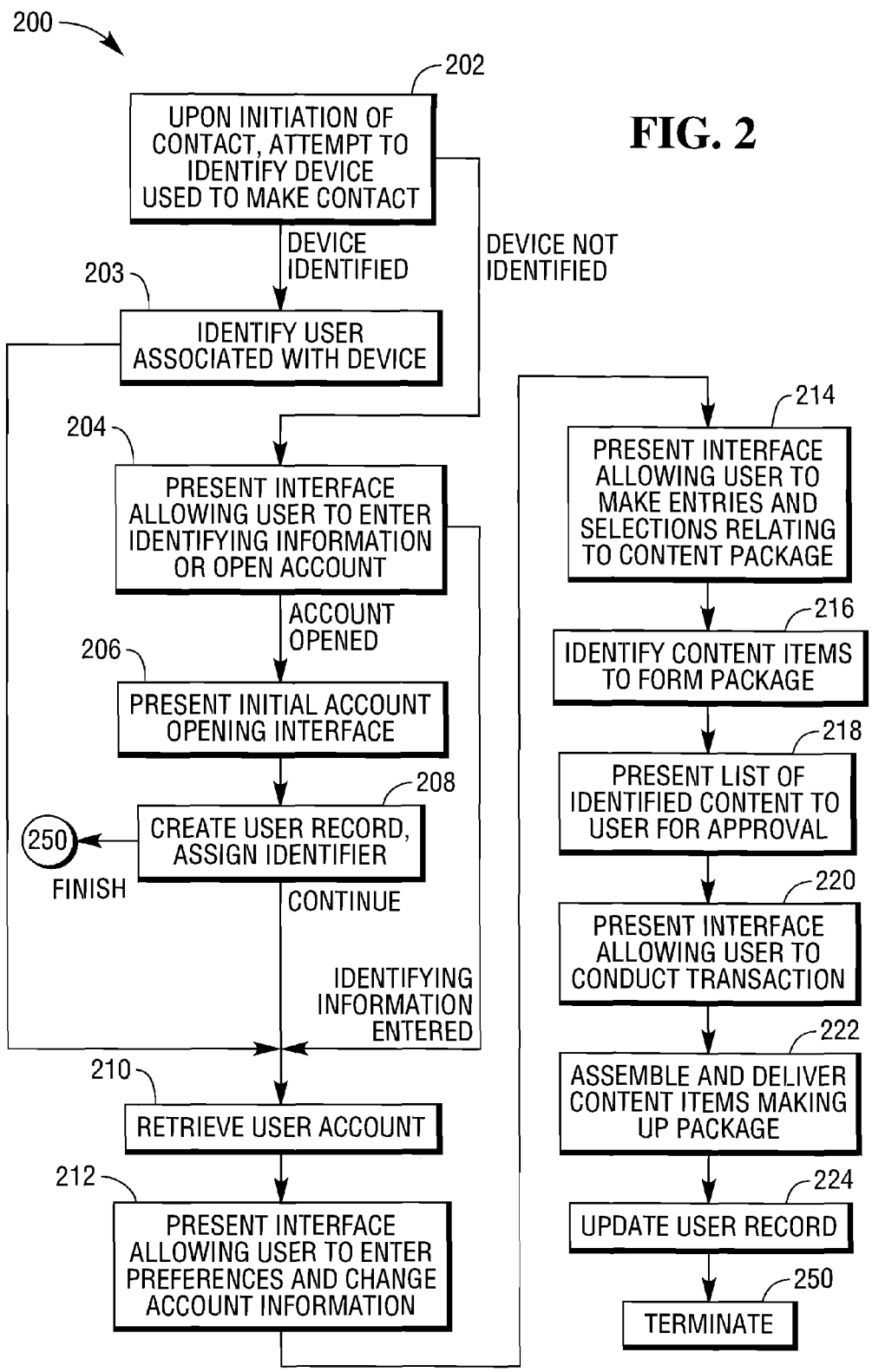
FIG. 2 illustrates a process of content selection and delivery according to an aspect of the present invention.

FIG. 2 illustrates a process 200 according to an aspect of the present invention. The process 200 may suitably be implemented using a system such as the system 100 of FIG. 1. At step 200, a repository of titles is assembled. At step 202, upon initiation of contact by a user, a device used to initiate contact is examined to determine if it can be identified. If the device can be identified, the process proceeds to step 203 and the user associated with the device is identified. The process then skips to step 210. If the device cannot be identified, the process skips to step 204 and an interface is presented to the user allowing the user to enter identifying information or choose to open an account. If the user enters identifying information, the process skips to step 210.

If the user chooses to open an account, the process proceeds to step 206 and an initial account information interface is presented, allowing entry of user identification information and information such as payment information, content preference information, both overall and with respect to various categories of activities, identifying information for user devices and device preference information identifying the various devices that may be used for different activities. Once the user has entered all the information desired, the process proceeds to step 208 and a user record is created for the user and a user identifier is assigned to the user. The user may then choose to conclude the session, in which case the process terminates at step 250, or to conduct further activities, in which case the process proceeds to step 210.

At step 210, the user account record associated with the user is retrieved. At step 212, the user is presented with an interface allowing the user to change preferences and provide relevant information, such as ratings of content items previously delivered, anticipated upcoming activities, changes in types of activities commonly engaged in, and the like. Upon a user indication that assembly of a content package is desired, the process proceeds to step 214 and an interface is presented allowing the user to make entries and selections indicating preferences relating to the content package. Upon indication by the user that indication of preferences is complete, the process proceeds to step 216 and content items are identified to form a package. At step 218, a list of the identified content items is presented to the user for approval, and at step 220, an interface is presented allowing the user to conduct a transaction, selecting payment methods and providing payment details, which may include acceptance of advertising. At step 222, the content items making up the package are assembled and made available to the user, such as by download to the user's computer, by transfer to the user's personal device at a kiosk, by delivery to a user's removable media device, or by wireless transfer to a user's data device. If desired, content may be protected using digital rights management (DRM) information and delivered, with the rights assigned by the DRM information depending on the nature of the payment transaction, such as a lower price for a limited time availability or a free or nominal transfer, permitting later authorization of playback upon a subsequent payment transaction and delivery of DRM information authorizing playback.

At step 224, the user record for the user is updated with details of the user preferences and selections and the identities of the content items comprising the package. At step 250, the process concludes.

While the present invention is disclosed in the context of a presently preferred embodiment, it will be recognized that a wide variety of implementations may be employed by persons of ordinary skill in the art consistent with the above discussion and the claims which follow below.

We claim:

1. A server for packaging and delivery of entertainment content, comprising:
    memory for storing entertainment content including a library of audio and video titles available for packaging and delivery;
    memory for storing user preference information relating to packaging and delivery of entertainment content, the stored user preference information including information relating to user activities accompanied by the use of entertainment content, including the types and expected duration of different activities and preferences relating to entertainment content accompanying various types and durations of activities; and
    a processor for receiving user identification information identifying a user and activity information identifying an activity for which entertainment content is desired, the processor being operative to examine the stored customer preference information and assemble a package of content for the identified activity based on the nature and duration of the activity and the customer preferences relating to the activity.

2. The server of claim 1, wherein the processor is operative to select a different mix of audio and video content that varies based on the nature of the activity, the mix ranging from no audio and all video to all audio and no video.

3. The server of claim 1, wherein the processor is operative to select between content requiring a higher power consumption and content requiring a lower power consumption based on the expected availability of external electric power during the activity.

4. The server of claim 1, wherein the processor is operative to select a package of exclusively audio content for an activity requiring focused attention on the activity.

5. The server of claim 1, wherein the processor is operative to direct delivery of content comprising the package from a stored content repository to a user device.

6. The server of claim 5, wherein the processor is operative to assemble and deliver a playlist directing playback of the content items delivered to the user device.

7. The server of claim 1, wherein the processor is operative to conduct a transaction for payment by a user and to deliver content comprising the package from a stored content repository to a user device upon payment authorization from the user.

8. The server of claim 1, wherein the processor is operative to conduct a transaction authorizing delivery of advertising content accompanying entertainment content and to deliver a package comprising the advertising content and the entertainment content upon acceptance of advertising content by a user.

9. The server of claim 5, wherein the processor is operative to deliver content protected using digital rights management information to a user device and to transfer digital rights management information needed to play the content upon subsequent payment by the user for the protected content.

10. A method of entertainment content selection and delivery, comprising the steps of:
    storing entertainment content including a library of audio and video titles available for packaging and delivery;
    storing user preference information relating to entertainment content accompanying user activities, the user preference information including information identifying the nature and expected duration of one or more user activities and preferences relating to entertainment content to accompany the activities; and
    controlling a processor to receive user information including user identification information and information identifying an activity to be engaged in by the user;
    controlling the processor to examine the stored user preference information to identify user preference information for the one or more activities; and
    controlling the processor to select content items comprising a package to be played sequentially in accompaniment to the activity, selection of the content items being based on the stored user preference information including preference information relating to the nature and duration of the activity.

11. The method of claim 10, wherein the information relating to the nature of an activity includes information indicating the degree of attention required by the activity and the preferences relating to the activities include a preference for audio to accompany activities requiring a higher degree of attention.

12. The method of claim 10, wherein the information relating to the nature of an activity includes information indicating whether external power will be available during the activity and the preferences relating to the activities include a preference for lower power consumption content to accompany activities for which external power will not be available.

13. The method of claim 10, further comprising a step of retrieving the selected content from a storage medium and delivering the content to a user device.

14. The method of claim 13, further comprising a step of assembling a playlist including a listing of the selected content and delivering the playlist to the user device along with the content.

15. The method of claim 13, wherein the step of retrieving the selected content from the storage medium and delivering the content to a user device comprises protecting the content using digital rights management (DRM) information.

16. The method of claim 10, further comprising conducting a payment transaction and retrieving the content from a storage medium and delivering the content to a user device upon payment authorization.

17. The method of claim 10, further comprising conducting a transaction for the acceptance of advertising content and delivering a package comprising the entertainment content and accompanying advertising content upon acceptance of the advertising content.

18. The server of claim 1 wherein the user identification information is utilized by the processor to identify the user and identification of the user is based upon recognizing an association between the user and an identified device used to communicate with the server.

19. The server of claim 18 wherein the processor evaluates preferences of the user employing multiple devices to communicate with the server on a device by device basis.

20. The server of claim 1 wherein the types of different activities comprise a social event, exercise and travel.

* * * * *